(12) United States Patent
Matsushima et al.

(10) Patent No.: US 10,315,957 B2
(45) Date of Patent: Jun. 11, 2019

(54) METHOD FOR PRODUCING TRANSPARENT ALUMINA SINTERED BODY

(71) Applicant: NGK INSULATORS, LTD., Nagoya (JP)

(72) Inventors: Kiyoshi Matsushima, Nagoya (JP); Morimichi Watanabe, Nagoya (JP); Kei Sato, Tokai (JP); Tsutomu Nanataki, Toyoake (JP)

(73) Assignee: NGK Insulators, Ltd., Nagoya (JP)

( * ) Notice: Subject to any disclaimer, the term of this patent is extended or adjusted under 35 U.S.C. 154(b) by 68 days.

(21) Appl. No.: 15/446,416

(22) Filed: Mar. 1, 2017

(65) Prior Publication Data

US 2017/0166484 A1 Jun. 15, 2017

Related U.S. Application Data

(63) Continuation of application No. PCT/JP2015/082643, filed on Nov. 20, 2015.

(30) Foreign Application Priority Data

Nov. 28, 2014 (JP) .................................. 2014-241685
May 13, 2015 (JP) .................................. 2015-098524

(51) Int. Cl.
  *C04B 35/115* (2006.01)
  *C04B 35/645* (2006.01)
  (Continued)

(52) U.S. Cl.
  CPC ............ *C04B 35/115* (2013.01); *C01F 7/442* (2013.01); *C04B 35/6262* (2013.01); *C04B 35/62675* (2013.01); *C04B 35/645* (2013.01); *C04B 35/6455* (2013.01); *C01P 2004/22* (2013.01); *C01P 2004/54* (2013.01); *C01P 2006/80* (2013.01); *C04B 2235/322* (2013.01); (Continued)

(58) Field of Classification Search
  CPC . C04B 35/115; C04B 35/645; C04B 35/6455; C04B 2235/5292
  See application file for complete search history.

(56) References Cited

U.S. PATENT DOCUMENTS

2010/0248935 A1  9/2010  Teratani et al.

FOREIGN PATENT DOCUMENTS

JP       51-30209 A1    3/1976
JP       01-286956 A1   11/1989
(Continued)

OTHER PUBLICATIONS

Hailan Yi, et al., "Crystal Plane Evolution of Grain Oriented Alumina Ceramics with High Transparency,"Science Direct, *Ceramics International*, vol. 38, 2012, pp. 5557-5561.
(Continued)

*Primary Examiner* — Erin Snelting
(74) *Attorney, Agent, or Firm* — Burr & Brown, PLLC (57) ABSTRACT

A method for producing a transparent alumina sintered body includes (a) the step of preparing an alumina raw material powder containing a plate-like alumina powder having an aspect ratio of 3 or more so that the mass ratio R1 of F to Al in the alumina raw material powder is 5 ppm or more, and forming a compaction raw material containing the alumina raw material powder into a compact, and (b) the step of pressure-sintering the compact at a temperature at which F evaporate to yield a transparent alumina sintered body.

8 Claims, 3 Drawing Sheets

(51) Int. Cl.
  *C01F 7/44* (2006.01)
  *C04B 35/626* (2006.01)
(52) U.S. Cl.
  CPC ............... *C04B 2235/3206* (2013.01); *C04B 2235/3217* (2013.01); *C04B 2235/445* (2013.01); *C04B 2235/5292* (2013.01); *C04B 2235/5296* (2013.01); *C04B 2235/5445* (2013.01); *C04B 2235/5472* (2013.01); *C04B 2235/602* (2013.01); *C04B 2235/604* (2013.01); *C04B 2235/6025* (2013.01); *C04B 2235/658* (2013.01); *C04B 2235/6586* (2013.01); *C04B 2235/668* (2013.01); *C04B 2235/72* (2013.01); *C04B 2235/721* (2013.01); *C04B 2235/724* (2013.01); *C04B 2235/725* (2013.01); *C04B 2235/787* (2013.01); *C04B 2235/9623* (2013.01); *C04B 2235/9653* (2013.01)

(56) References Cited

FOREIGN PATENT DOCUMENTS

| JP | 2004-359495 A1 | 12/2004 |
| JP | 4357584 B2 | 11/2009 |
| JP | 5396176 B2 | 1/2014 |
| JP | 5501040 B2 | 5/2014 |

OTHER PUBLICATIONS

International Search Report and Written Opinion (Application No. PCT/JP2015/082643) dated Feb. 16, 2016.

English translation of the International Preliminary Report on Patentability (Application No. PCT/JP2015/082643) dated Jun. 8, 2017.

METHOD FOR PRODUCING TRANSPARENT ALUMINA SINTERED BODY

BACKGROUND OF THE INVENTION

1. Field of the Invention

The present invention relates to a method for producing a transparent alumina sintered body.

2. Description of the Related Art

Highly dense, highly pure polycrystalline alumina is known to be optical translucent and can be used, for example, in high-pressure sodium lamp arc tubes, highly heat-resistant window materials, members of semiconductor devices, and substrates for optical components. Unfortunately, the crystal structure of alumina is optically anisotropic. If alumina grains in an alumina sintered body are randomly oriented, the crystal grains have different refractive indices. Thus, the sintered body scatters light and the transmittance thereof decreases. It is desirable that alumina grains in a transparent alumina having a high in-line transmittance be uniaxially oriented. For example, NPL 1 discloses a method for producing transparent alumina. In this method, highly pure, highly aligned, and highly dense transparent alumina is produced by using a high magnetic field.

Also, there is known a method in which in order to improve the sinterability of the alumina, a fluoride is added to an alumina raw material powder before sintering in a process for producing an alumina sintered body. For example, in PTLs 1 and 2, a dense alumina sintered body is produced by mixing an alumina powder and a fluoride powder, and then sintering the mixture at a low temperature of 1300° C. or less. In PTL 3, a corrosion-resistant, impact-resistant, and durable alumina sintered body is produced by adding a fluoride to an alumina raw material powder, pulverizing and mixing the materials to an average particle diameter of 2 µm or less, compacting the mixture, and sintering the compact in air at a temperature of 1600° C. to 1800° C.

CITATION LIST

Patent Literature

PTL 1: JP 5396176 B
PTL 2: JP 5501040 B
PTL 3: JP 4357584 B

Non Patent Literature

NPL 1: Ceramics International 38 (2012) 5557-5561

SUMMARY OF THE INVENTION

Although the method disclosed in NPL 1 can produce transparent alumina, it is unsuitable for large-scale production. The use of a high magnetic field increases the production cost and makes it difficult to increase the process scale.

The methods disclosed in PTLs 1 and 2 do not take into account the orientation of alumina grains. Consequently, the alumina grains are randomly aligned. It is therefore expected that the transparency of the resulting alumina sintered body will be low.

The method disclosed in PTL 3 produces an alumina sintered body in which the crystals are hardly oriented and the alumina grains are randomly distributed. It is therefore expected that the transparency of the alumina sintered body will be low. Thus, to date, a method for easily producing a transparent alumina sintered body at a low cost remains unknown.

The present invention is intended to solve this issue, and a major object of the present invention is to easily produce a transparent alumina sintered body at a low cost.

The first method for producing a transparent alumina sintered body in the present invention comprises:

(a) the step of preparing an alumina raw material powder containing a plate-like alumina powder having an aspect ratio of 3 or more so that a mass ratio R1 of F to Al in the alumina raw material powder is 5 ppm or more, and forming a compaction raw material containing the alumina raw material powder into a compact; and (b) the step of pressure-sintering the compact at 1700° C. or more to yield a transparent alumina sintered body.

In addition, the first method for producing a transparent alumina sintered body in the present invention is a method wherein the mass ratio R1 is a ppm-by-mass value calculated using the following equation (1), and wherein in equation (1), X represents the mass ratio (ppm by mass) of F to Al in the plate-like alumina powder, the F content in the plate-like alumina powder is obtained by pyrohydrolysis-ion chromatography, the Al content in the plate-like alumina powder is calculated by using a value obtained by multiplying by 0.529 the alumina purity of the plate-like alumina powder defined as 100−(total percentage by mass of impurity elements other than Al and O), and the percentage by mass of each impurity element is determined by performing firing (high-frequency heating)-infrared absorption spectroscopy for S, inert gas fusion-thermal conductivity method for N, inert gas fusion-non-dispersive infrared absorption spectroscopy for H, pyrohydrolysis-ion chromatography for F, and ICP (inductively coupled plasma) emission spectroscopy for the other elements:

$$R1 = X \times (\text{mass of plate-like alumina/mass of alumina raw material powder}) \quad (1)$$

The second method for producing a transparent alumina sintered body in the present invention comprises:

(a) the step of preparing an alumina raw material powder containing a plate-like alumina powder having an aspect ratio of 3 or more so that a mass ratio R2 of F to Al in the alumina raw material powder is 15 ppm or more, and forming a compaction raw material containing the alumina raw material powder into a compact; and (b) the step of pressure-sintering the compact at 1700° C. or more to yield a transparent alumina sintered body.

In addition, the second method for producing a transparent alumina sintered body in the present invention is a method wherein the mass ratio R2 is a ppm-by-mass value calculated using the following equation (2), and wherein the proportion of the plate-like alumina powder to a fine alumina powder in the alumina raw material powder is T:(100−T) on a mass basis, and if an additive is externally added to the alumina raw material powder, the proportion of the additive to the alumina raw material powder is Z (% by mass), wherein x1 represents the F content (ppm by mass) in the plate-like alumina powder, x2 represents the F content (ppm by mass) in the fine alumina powder, x3 represents the F content (ppm by mass) in the additive, and the F content is obtained by alkali fusion-ion chromatography, wherein y1 represents the Al content (% by mass) in the plate-like alumina powder, y2 represents the Al content (% by mass) in the fine alumina powder, the Al content is defined as a value obtained by multiplying by 0.529 the alumina purity of the corresponding alumina powder defined as 100−(total percentage by mass of impurity elements other than Al and O), and the percentage by mass of each impurity element is determined by performing firing (high-frequency heating)-infrared absorption spectroscopy for S, inert gas fusion-thermal conductivity method for N, inert gas fusion-non-dispersive infrared absorption spectroscopy for H, alkali fusion-ion chromatography for F, and ICP emission spectroscopy for the other elements, and wherein y3 represents the Al content (% by mass) in the additive, determined by ICP emission spectroscopy:

$$R2=100\times[x1\times T+x2\times(100-T)+x3\times Z]/[y1\times T+y2\times(100-T)+y3\times Z] \quad (2)$$

In the first and the second method for producing a transparent alumina sintered body, the compaction raw material containing a plate-like alumina powder having an aspect ratio of 3 or more is compacted and then sintered by pressure sintering. Consequently, the resulting alumina sintered body exhibits a high degree of orientation. Also, since the alumina raw material powder contains an appropriate amount of F, the sinterability of the alumina raw material powder is improved, such that the alumina sintered body is satisfactorily densified. Furthermore, since the sintering is performed at a temperature at which F evaporates from the powder and/or the compact, the F content in the resulting alumina sintered body can be reduced to zero or minimized. Consequently, the resulting alumina sintered body has a high degree of orientation, a high density, and a high purity, thus exhibiting a high transparency. Also, since the method disclosed herein does not require a high magnetic field, the cost for producing the transparent alumina sintered body can be reduced. In addition, the method can easily produce transparent alumina sintered bodies, accordingly suitable for large-scale production.

BRIEF DESCRIPTION OF THE DRAWINGS

FIGS. 1A and 1B are schematic views of a plate-like alumina particle.

DETAILED DESCRIPTION OF THE INVENTION

A method for producing a transparent alumina sintered body includes:

(a) the step of preparing an alumina raw material powder containing a plate-like alumina powder having an aspect ratio of 3 or more so that the mass ratio R1 of F to Al in the alumina raw material powder is 5 ppm or more (or so that mass ratio R2 is 15 ppm or more), and forming a compaction raw material containing the alumina raw material powder into a compact; and (b) the step of pressure-sintering the compact at 1700° C. or more to yield a transparent alumina sintered body.

Figure 1A:
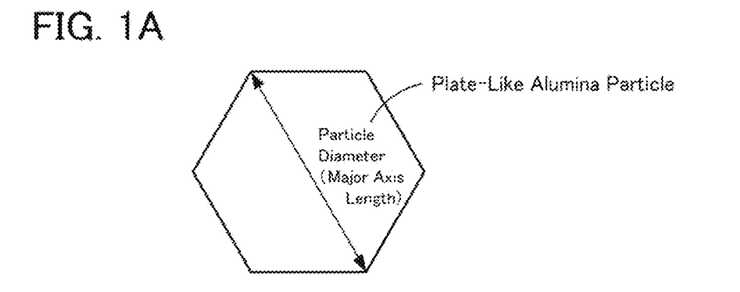
FIG. 1A is a plan view thereof.
Figure 1B:
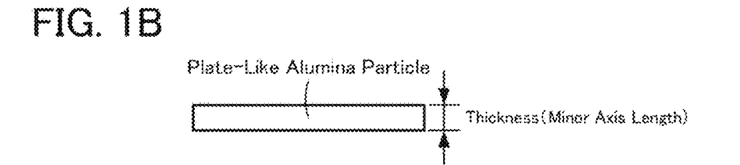
FIG. 1B is a front view thereof.

In Step (a), a plate-like alumina powder is used. The plate-like alumina powder has an aspect ratio of 3 or more. The aspect ratio is defined by average particle diameter/average thickness. The average particle diameter mentioned herein refers to the average length of the major axis length of the plate-like surfaces of powder particles, and the average thickness refers to the average length of the minor axis length of the particles. These values are determined by observing 100 particles randomly selected from the plate-like alumina powder under a scanning electron microscope (SEM). FIGS. 1A and 1B show schematic views of a plate-like alumina particle: FIG. 1A is a plan view thereof; and FIG. 1B is a front view thereof. The plate-like alumina particle has a substantially hexagonal shape when viewed from above. The particle diameter thereof is defined as shown in FIG. 1A, and the thickness is defined as shown in FIG. 1B. By using an alumina raw material powder containing a plate-like alumina powder having an aspect ratio of 3 or more, the degree of orientation of the resulting alumina sintered body is increased. The average particle diameter of the plate-like alumina powder is desirably large from the viewpoint of increasing the degree of orientation. It is preferably 1.5 µm or more, more preferably 5 µm or more, still more preferably 10 µm or more, and particularly preferably 15 µm or more. From the viewpoint of densification, however, it is desirably small, and preferably 30 µm or less. Accordingly, the average particle diameter is preferably in the range of 1.5 µm to 20 µm from the viewpoint of achieving both a high degree of orientation and a high density.

Preferably, a highly pure plate-like alumina powder is used. For example, the purity of the plate-like alumina powder is preferably 99% by mass or more, more preferably 99.9% by mass or more, and still more preferably 99.99% by mass or more. The powder however may contain impurities, such as F and S, to be removed or reduced in amount by evaporation during sintering. A highly pure plate-like alumina powder may be prepared, for example, by the following procedure. First, at least one transition alumina powder selected from the group consisting of powders of gibbsite, boehmite, and γ-alumina and AlF$_3$ powder are mixed so that the AlF$_3$ content becomes 0.25% by mass or more. Thus a mixed powder was prepared in which the total mass of impurity elements other than F, H, C, and S is 1000 ppm or less. Preferably, an α-alumina particle is added as a seed crystal to the mixed powder. Subsequently, a container is prepared so that the mass of the AlF$_3$ in the mixed powder divided by the volume of the container (=mass of AlF$_3$/container volume) is 1×10$^{-4}$ g/cm$^3$ or more. The total content of the elements other than Al, O, Mg, N, and Re (Re: rare earth elements) in the material of the container is preferably 1% by mass or less. The material of the container is preferably Al$_2$O$_3$ having a purity of 99.5% by mass or more. Then, the mixed powder is placed in the container, and the container is covered with a lid or sealed. Alternatively, the mixed powder is enclosed in a container made of a porous material. The mixed powder in the container is subjected to heat treatment at 750° C. to 1650° C. to yield a plate-like alumina powder made up of plate-like α-alumina particles. The thus prepared plate-like alumina powder is used as the plate-like alumina powder for Step (a). The plate-like alumina powder may be subjected to annealing at 600° C. to 1350° C., preferably 900° C. to 1350° C., in an inert gas atmosphere or in a vacuum before use in Step (a). Thus prepared plate-like alumina powder may contain a small amount of F derived from AlF$_3$, depending on the conditions of annealing or the like. The plate-like alumina powder may be pulverized before use.

In Step (a), an alumina raw material powder is used. The alumina raw material powder is a material prepared so that the mass ratio R1 of F to Al in the alumina raw material powder is 5 ppm or more, or so that the mass ratio R2 is 15 ppm or more. F functions as a sintering aid that promotes the sintering of the alumina powder. If mass ratio R1 is less than 5 ppm or mass ratio R2 is less than 15 ppm, densification does not proceed sufficiently during sintering, and pores remain in the resulting alumina sintered body, reducing in-line transmittance. Although the upper limits of mass ratios R1 and R2 are not limited to the above mentioned values, an excessively large R1 or R2 value can result in being lower translucent due to a reduced degree of orientation caused by excessive grain growth or abnormal growth of grains with trapped air. In view of these points, mass ratio R1 is preferably 6300 ppm or less, more preferably 3000 ppm or less, still more preferably 1500 ppm or less, yet preferably 1000 ppm or less, further preferably 100 ppm or less, still further preferably 50 ppm or less, and yet still further preferably 25 ppm or less. Also, mass ratio R2 is preferably 10000 ppm or less, more preferably 5000 ppm or less, still more preferably 2500 ppm or less, and particularly preferably 1000 ppm or less. Mass ratios R1 and R2 are obtained from the above-described equations (1) and (2), respectively.

Figure 2:
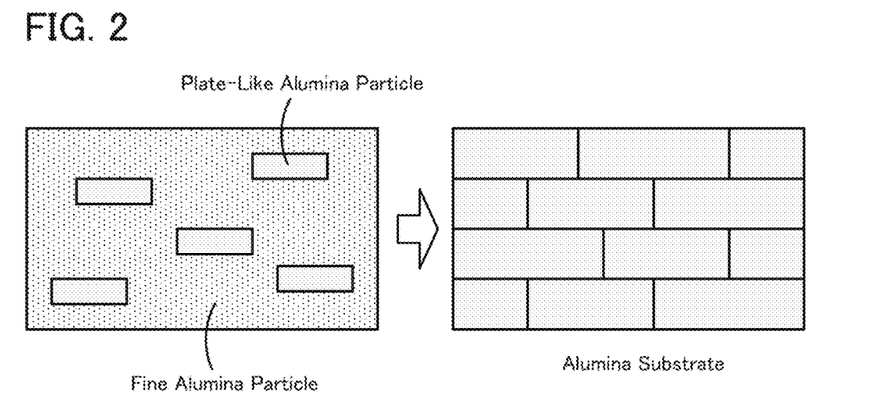
FIG. 2 is a schematic representation of a process for producing an alumina sintered body by a TGG method.

Although the alumina raw material powder may be composed of only the plate-like alumina powder having an aspect ratio of 3 or more, it is preferable to use a mixed alumina powder of the plate-like alumina powder and a fine alumina powder having a smaller average particle diameter than the plate-like alumina powder. If the plate-like alumina powder having an aspect ratio of 3 or more is solely used as the alumina raw material powder, the average particle diameter of the plate-like alumina powder is preferably small. For example, a powder having an average particle diameter of 1 µm or less is preferably used. If a mixed alumina powder of the plate-like alumina powder and a fine alumina powder is used as the alumina raw material powder, the orientations of the plate-like alumina particles are likely to be aligned by sintering. Also, during firing, the plate-like alumina powder acts as seed crystals (templates), and the fine alumina powder acts as a matrix. The templates grow homoepitaxially while taking in the matrix. This production method is called TGG (Templated Grain Growth). The proportion of the plate-like alumina powder to the fine alumina powder in the mixed powder is T: (100–T) (T is 0.001 to 50) on a mass basis. If T is less than 0.001, the degree of orientation of the resulting alumina sintered body can be difficult to increase; if T is more than 50, alumina can be difficult to sinter. In view of the degree of orientation, T is preferably 0.1 or more, more preferably 0.5 or more, and still more preferably 1.5 or more. Also, in view of the sinterability, it is preferably 15 or less, more preferably 10 or less, still more preferably 5 or less, and particularly preferably 2.5 or less. From the viewpoint of achieving both a desired degree of orientation and a desired sinterability, T is preferably 0.001 to 15, more preferably 0.1 to 15, still more preferably 0.5 to 10, yet still more preferably 0.5 to 5, further preferably 1.5 to 5, and particularly preferably 1.5 to 2.5. FIG. 2 shows a schematic representation of a process for producing an alumina sintered body by a TGG method. In the TGG method, the fine structure of the resulting alumina sintered body can be controlled by varying the particle diameters and the mixing ratio of the plate-like alumina powder and the fine alumina powder. Also, the TGG method facilitates densification and an increase in the degree of orientation, compared with the case where the plate-like alumina powder is solely sintered.

In Step (a), a compaction raw material containing the alumina raw material powder is prepared. The compaction raw material may be the alumina raw material powder itself or may further contain a sintering aid, graphite, a binder, a plasticiser, a dispersant, a dispersion medium, or the like, as required, in addition to the alumina raw material powder. The sintering aid is preferably MgO. This is because MgO facilitates densification while suppressing excessive grain growth. In particular, when the alumina raw material powder contains a relatively large amount of F, grains are likely to grow excessively. The addition of MgO is significant in such a case. If MgO powder is added to the alumina raw material powder, it is preferable to add 100 ppm to 5000 ppm by mass of MgO powder to 100 parts by mass of the alumina raw material powder. The addition of MgO may be performed by adding a magnesium compound to be converted into MgO during sintering or in any other step, such as a carbonate, sulfate, nitrate, or hydroxide, if any of these magnesium compounds are added, the compound may be a powder or liquid, as long as the proportion thereof to be added is 100 ppm to 5000 ppm by mass in terms of MgO.

In Step (a), the compaction raw material is formed into a compact. The forming may be performed by any method without particular limitation, and may be performed by, for example, tape forming, extrusion, cast molding, injection molding, or uniaxial pressing.

In Step (b), a transparent alumina sintered body is produced by pressure-sintering the compact at a temperature at which F evaporates. F, which functions as a sintering aid, does not remain at the surface of the sintered body if the compact is sintered at 1700° C. or more. For this pressure sintering, for example, hot press sintering, HIP sintering, or peak plasma sintering (SPS) may be performed. The hot-press sintering may be preferably performed in an atmosphere of, but not limited to, an inert gas, such as nitrogen or Ar, or vacuum. If it is performed in a vacuum atmosphere, the pressure is desirably low. The pressure is preferably 1 Pa or less, more preferably 0.1 Pa or less, and particularly preferably 0.01 Pa or less. The lower limit is not specified. Before the pressure sintering, pressureless pre-sintering may be performed in advance. The pressureless pre-sintering may be performed, but not limited to, in a vacuum or in an atmosphere of an inert gas, such as nitrogen or Ar, hydrogen gas, or air. A vacuum or an atmosphere of hydrogen is preferred, and a vacuum is most preferred. A low pressure is desirable in the vacuum atmosphere. The pressure is preferably 1 Pa or less, more preferably 0.1 Pa or less, and particularly preferably 0.01 Pa or less. The lower limit is not specified. For HIP sintering, a capsule method may be applied. In this instance, the sintering temperature (maximum temperature) is preferably 1700° C. to 2050° C., and more preferably 1750° C. to 2000° C. For hot-press sintering, the pressure is preferably 50 kgf/cm$^2$ or more, and more preferably 200 kgf/cm$^2$ or more. For HIP sintering, the pressure is preferably 1000 kgf/cm$^2$ or more, and more preferably 2000 kgf/cm$^2$ or more.

In Step (b), it is preferable to apply a pressuring pressure of 50 kgf/cm$^2$ or more during cooling from the maximum temperature to a predetermined temperature (in the range of 1000° C. to 1400° C. (preferably 1100° C. to 1300° C.)). This operation can increase the transparency of the resulting sintered body. Although a certain degree of transparency can be obtained by reducing pressure immediately after keeping the sintered body at the maximum temperature for a time, the transparency can be further increased by cooling to a predetermined temperature with the applied pressure maintained. Although the reason of this is not clear, it can be assumed that reducing pressure at the maximum temperature forms pores in the sintered body, thereby reducing the transparency. In Step (b), also, the pressure is reduced preferably to less than 50 kgf/cm² in the temperature range of less than the predetermined temperature. This operation suppresses the occurrence of cracks in the sintering body. Such reduction of pressure is particularly performed on large sintered bodies, which are liable to crack. Also, when hot-press sintering or SPS sintering is employed, such reduction of pressure is preferably performed. Thus, the timing when the pressing pressure is reduced is very important from the viewpoint of increasing the transparency and reducing cracking. The particularly suitable timing for achieving these two points is at 1200° C. during cooling.

The alumina sintered body produced by the method of the present invention has a high degree of orientation, a high density, and a high purity, thus exhibiting a high transparency. For the degree of orientation, the degree of c-plane orientation of the sintered body can be 5% or more (preferably 80% or more, more preferably 90% or more), as estimated by the Lotgering's method using an X-ray diffraction profile in the 2θ range of 20° to 70° prepared by performing irradiation with X-ray radiation. For density, when a section polished by ion milling is observed under a scanning electron microscope at a magnification of 5000 times, the number of pores can be zero or 5 or less. For purity, the proportion of the total mass of impurity elements other than Mg and C can be 100 ppm or less (preferably 50 ppm or less, more preferably 10 ppm or less). It is preferable to produce an alumina sintered body in which the content of impurity elements other than Mg, C, and F is 10 ppm by mass or less. For convenience, the alumina content is defined as the value obtained by subtracting the total mass (%) of impurity elements from 100, and it can be 99.8% by mass or more, more preferably 99.9% by mass or more. For optical translucent, a 0.2 mm-thick sample cut out of the alumina sintered body can exhibit an in-line transmittance of 60% or more (preferably 70% or more) in the wavelength range of 350 nm to 1000 nm. Also, a 0.5 mm-thick sample can exhibit an in-line transmittance of 50% or more in the wavelength range of 300 nm to 1000 nm.

EXAMPLES

Experimental Example 1

1. Production of Alumina Sintered Body
(1) Preparation of Plate-Like Alumina Powder In a ball mill, 96 parts by mass of highly pure γ-alumina (TM-300D, produced by Taimei Chemicals), 4 parts by mass of highly pure $AlF_3$ (produced by Kanto Chemical, Cica-specified high grade), 0.17 part by mass of highly pure α-alumina (TM-DAR, produced by Taimei Chemicals, D50=1 μm) as seed crystals, and IPA (isopropyl alcohol) as a solvent were mixed with alumina balls of 2 mm in diameter for 5 hours. The proportion of the total mass of impurity elements other than F, H, C, and S in the resulting mixed powder was 1000 ppm or less. A highly pure alumina sagger (capacity: 750 cm³) having a purity of 99.5% by mass was charged with 300 g of the resulting mixed raw material powder and was then covered with a highly pure alumina lid having a purity of 99.5% by mass. Thus the raw material powder was heat-treated at 900° C. for 3 hours in flowing air in an electric furnace. The flow rate of the flowing air was 25000 cc/min. After the heat treatment, the powder was annealed in air at 1150° C. for 40 hours and then pulverized with alumina balls of 2 mm in diameter for 4 hours to yield a plate-like alumina powder having an average particle diameter of 2 μm, an average thickness of 0.2 μm, and an aspect ratio of 10. The average particle diameter and the average thickness are determined by observing 100 particles randomly selected from the plate-like alumina powder under a scanning electron microscope (SEM). The average particle diameter refers to the average length of the major axis length of the particles; the average thickness refers to the average length of the minor axis length of the particles; and the aspect ratio refers to the value of average particle diameter/average thickness. The resulting plate-like alumina powder was α-alumina.

The plate-like alumina powder prepared as above was subjected to the following quantitative analysis for impurity elements. Then, the mass ratio X (ppm by mass) of F to Al in the plate-like alumina powder and the F content x1 (ppm by mass) in the plate-like alumina powder were obtained. The mass ratio X is a value calculated using the mass of F measured by pyrohydrolysis-ion chromatography, and the F content x1 is a value calculated using the mass of F measured by Alkali fusion-ion chromatography. The pyrohydrolysis-ion chromatography mainly measures F in the surface of a sample, while the alkali fusion-ion chromatography measures F in a fused sample, that is, in the entire sample. The mass ratios X and the F content x1 in the plate-like alumina powder in Experimental Example 1 were 490 ppm and 5600 ppm, respectively. Except for Al, only F was detected, and the contents of the other impurity elements were all below the detection limit. The purity of the plate-like alumina powder, defined as (100−mass (%) of F), was 99.97%.

C, S: firing (high-frequency heating)-infrared absorption spectroscopy

N: inert gas fusion-thermal conductivity method

H: inert gas fusion-non-dispersive infrared absorption spectroscopy

F: pyrohydrolysis-ion chromatography, alkali fusion-ion chromatography

Other impurity elements (mainly, Si, Fe, Ti, Na, Ca, Mg, K, P, V, Cr, Mn, Co, Ni, Cu, Zn, Y, Zr, Pb, Bi, Li, Be, B, Cl, Sc, Ga, Ge, As, Se, Br, Rb, Sr, Nb, Mo, Ru, Rh, Pd, Ag, Cd, In, Sn, Sb, Te, Cs, Ba, Hf, Ta, W, Ir, Pt, Au, Hg, La, Ce, Pr, Nd, Sm, Eu, Gd, Tb, Dy, Ho, Er, Tm, Yb, and Lu): ICP emission spectroscopy (2) Tape Forming A mixed alumina powder was prepared by mixing 5 parts by mass of the plate-like alumina powder prepared in (1) described above and 95 parts by mass of a fine alumina powder (TM-DAR, average particle diameter: 0.1 μm, produced by Tairoei Chemicals). To 100 parts by mass of the resulting mixed alumina powder were added and mixed together 0.025 part by mass (250 ppm by mass) of magnesium oxide (500A, produced by Ube Material Industries), 0.01 part by mass of graphite powder (UF-G5, produced by Showa Denko), 7.8 parts by mass of polyvinyl butyral (product code: BM-2, produced by Sekisui Chemical) as a binder, 3.9 parts by mass of di(2-ethylhexyl) phthalate (produced by Kurogane Kasei) as a plasticizer, 2 parts by mass of sorbitan trioleate (RHEODOL SP-O 30, produced by Kao) as a dispersant, and 2-ethylhexanol as a dispersion medium. The amount of the dispersion medium was adjusted so that the viscosity of the slurry was 20000 cP. The resulting slurry thus prepared was formed into a sheet having a dried thickness of 20 μm on a PET film by a doctor blade method. The resulting tape was cut into circular pieces having a diameter of 50.8 mm (2 inches), and 150 circular pieces were stacked on a 10 mm-thick Al plate and then placed in a package. The package was evacuated to prepare a vacuum package. This vacuum package was subjected to isostatic pressing at a pressure of 100 kgf/cm² in a warm water of 85° C. to yield a disk-shaped compact.

The mass ratios R1 and R2 (each ppm) of F to Al were obtained using the above-described equations (1) and (2), respectively. The mass ratios R1 and R2 in the mixed alumina powder in Experimental Example 1 were 24 ppm and 529 ppm, respectively.

(3) Sintering

Figure 3:
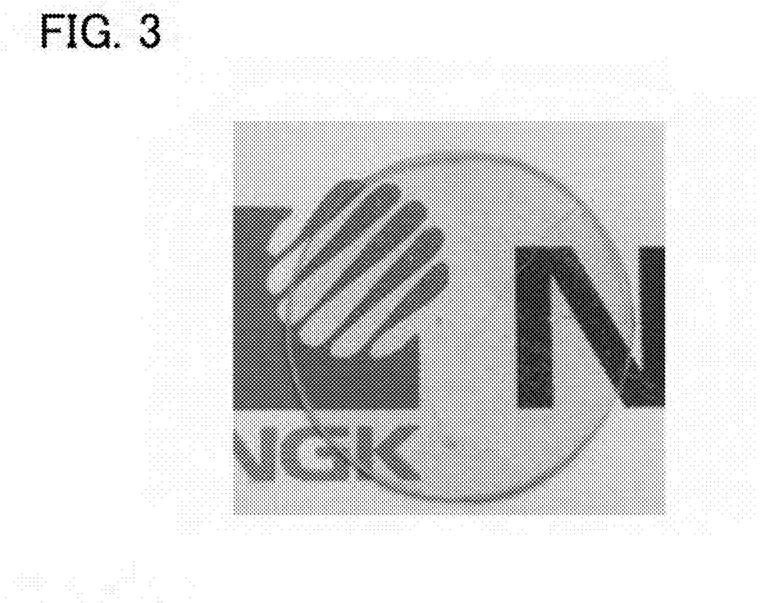
FIG. 3 is an exterior photograph of the alumina sintered body sample.

The resulting compact was degreased in a degreasing furnace at 600° C. for 10 hours. The degreased body was sintered to produce an alumina sintered body with a graphite mold by hot-pressing at a surface pressure of 200 kgf/cm² and 1800° C. in a nitrogen atmosphere for 4 hours. FIG. 3 shows an exterior photograph of the resulting alumina sintered body sample. The logo NGK shown in FIG. 3 is a registered trademark of NGK Insulators.

The operations described in above 1. (1) and 1. (2) correspond to Step (a) in the present invention, and the operation described in above 1. (3) corresponds to Step (b).

2. Properties of Alumina Sintered Body (1) Degree of c-Plane Orientation

In order to check the degree of orientation of the resulting alumina sintered body, the disk-shaped alumina sintered body was polished parallel to the upper surface thereof, and then the polished surface was irradiated with X-ray radiation for measuring the degree of c-plane orientation. The XRD profile was measured in the 2θ range of 20° to 10° with an XRD apparatus (RINT-TTR III, manufactured by Rigaku). More specifically, the measurement was performed with CuKa radiation at a voltage of 50 kV and a current of 300 mA. The degree of c-plane orientation was calculated by the Lotgering's method. More specifically, the following equations were used for calculation. The term c-plane refers to the (006) plane of alumina. In the equations, P represents a value obtained by XRD of the alumina sintered body, and $P_0$ represents a value calculated by using a standard α-alumina (JCPDS card No. 46-1212). The degree of c-plane orientation of the alumina sintered body of Experimental Example 1 was 99.7%.

$$\text{Degree of C-Plane Orientation}[\%] = \frac{p - p_0}{1 - p_0} \times 100 \quad \text{[Math. 1]}$$

$$p_0 = \frac{I_0(006)}{\sum I_0(hkl)}$$

$$p = \frac{I_s(006)}{\sum I_s(hkl)}$$

(2) Number of Pores (Density)

Figure 4:
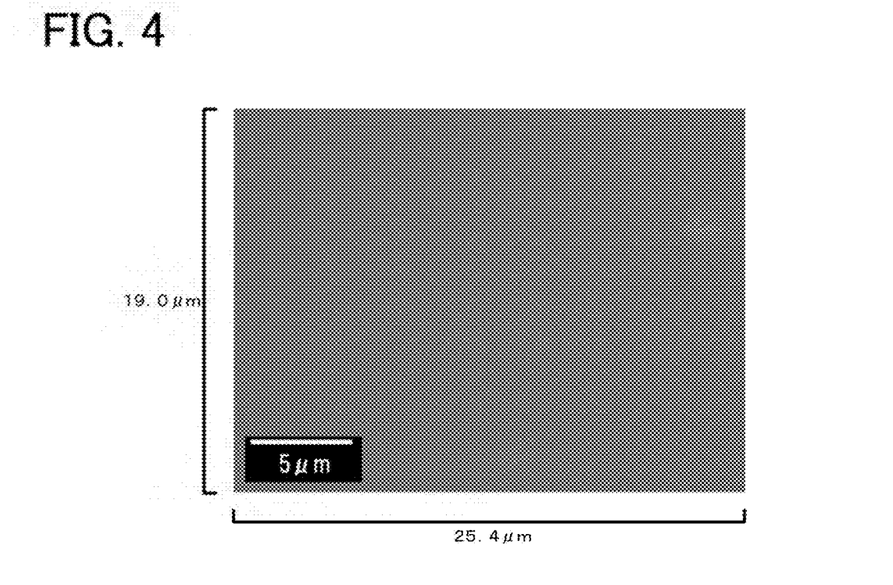
FIG. 4 is a high-magnification photograph of a polished section of the alumina sintered body.
Figure 5:
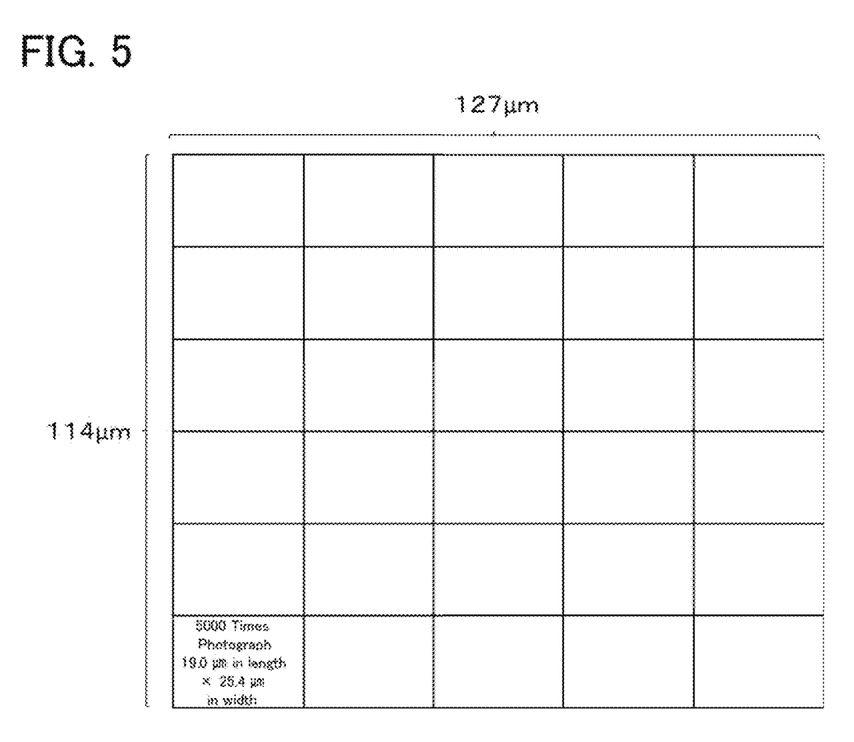
FIG. 5 is an explanatory drawing showing high-magnification photographs aligned as continuous photographs.

A section of the resulting alumina sintered body was polished with a cross-section polisher (CP) (IB-Q9010CP, produced by JEOL). The CP is a type of ion milling apparatuses. The reason of using CP is that it does not leave polish debris on the polished surface. The polished section was photographed under a scanning electron microscope (JSM-6390 manufactured by JEOL). More specifically, fields of view as shown in FIG. 4, each measuring 19.0 μm in length×25.4 μm in width were photographed at a magnification of 5000 times, and the photographs were arranged as shown in FIG. 5 in such a manner that 6 photographs in a vertical direction by 5 photographs in a horizontal direction formed a continuous photographic image (114 μm in length× 127 μm in width). Thus the number of pores was visually counted. Since pores and the other portions have a high contrast in brightness or darkness, they are easily distinguished by visual observation. The number of pores observed in the alumina sintered body of Experimental Example 1 was 0. Also, photographs of fields of view, each measuring 223.4 μm in length×321.4 μm in width and taken at a magnification of 500 times, were arranged in such a manner that 6 photographs in a vertical direction by 5 photographs in a horizontal direction formed a continuous photographic image (1340.4 μm in length×1607.0 μm in width). Thus the number of pores of 1 μm or more in diameter was visually counted. In this case, the number of pores observed in the alumina sintered body of Experimental Example 1 was 2.

(3) Amount of Impurities

The alumina sintered body was ground in a mortar made of alumina having a purity of 99.9% and was then subjected to the following quantitative analysis for impurity elements. Then, the proportion (ppm) of the total mass of impurity elements other than Mg and C (ppm) and the proportion (ppm) of the mass of Mg and C in the alumina sintered body were obtained. In the alumina sintered body of Experimental Example 1, the contents of impurity elements other than Mg and C were all below the detection limit. The amount of Mg detected was 114 ppm, and the amount of C detected was 40 ppm.

C, S: firing (high-frequency heating)-infrared absorption spectroscopy

N: inert gas fusion-thermal conductivity method

H: inert gas fusion-non-dispersive infrared absorption spectroscopy

F: pyrohydrolysis-ion chromatography

Other impurity elements (mainly, Si, Fe, Ti, Na, Ca, Mg, K, P, V, Cr, Mn, Co, Ni, Cu, Zn, Y, Zr, Pb, Bi, Li, Be, B, Cl, Sc, Ga, Ge, As, Se, Br, Rb, Sr, Nb, Mo, Ru, Rh, Pd, Ag, Cd, In, Sn, Sb, Te, Cs, Ba, Hf, Ta, W, Ir, Pt, Au, Hg, La, Ce, Pr, Nd, Sm, Eu, Gd, Tb, Dy, Ho, Er, Tm, Yb, and Lu): ICP emission spectroscopy (4) $Al_2O_3$ Content The $Al_2O_3$ content (% by mass) in the alumina sintered body was conveniently estimated using the sum S of the percentages by mass of elements other than Al and O in the alumina sintered body, determined by the above quantitative analysis, and the equation 100−S. The $Al_2O_3$ content in the alumina sintered body of Experimental Example 1 was 99.98% by mass.

(5) In-Line Transmittance

The resulting alumina sintered body was cut out into pieces, each having a size of 10 mm×10 mm. Four of the pieces were fixed to the outer periphery of a metal surface plate of 68 mm in diameter at intervals of 90°, and were lapped (pre-polished) on a SiC polishing paper at #800 for 10 minutes and at #1200 for 5 minutes, with a load of only the weights of the metal surface plate and a polishing jig (1314 g in total). Then, the test pieces were lapped with diamond abrasive grains on a ceramic surface plate. The lapping was performed with abrasive grains of 1 μm in grain diameter for 30 minutes and subsequently with 0.5 μm abrasive grains for 2 hours. The polished test pieces of 10 mm×10 mm×0.2 mm in thickness were washed with acetone, ethanol, and ion exchanged water, in that order, for 3 minutes each, and were then subjected to measurement for in-line transmittance in the wavelength range of 350 nm to 1000 nm with a spectrophotometer (Lambda 900, manufactured by Perkin Elmer). The in-line transmittance of the alumina sintered body of Experimental Example 1 was 80.3% or more in the wavelength range of 350 nm to 1000 nm. Also, the in-line transmittance of a 0.5 mm-thick test piece was 66.0% or more in the wavelength range of 300 nm to 1000 nm.

The production conditions and properties of the alumina sintered body of Experimental Example 1 are shown together in Table 1.

TABLE 1

| | Production Conditions of Alumina Sintered Body | | | | | | | |
|---|---|---|---|---|---|---|---|---|
| | Peparation of Plate-Like Alumina Powder | | | Tape Forming | | | | |
| Experimental Example | $\gamma$-$Al_2O_3$ (% by mass) | $AlF_3$ (% by mass) | Annealing Temperature (° C.) | Mixing Ratio[1] | Added Amount of $AlF_3$ (% by mass) | R1 | R2 | Amount of MgO[2] (ppm by mass) | Sintering |
|---|---|---|---|---|---|---|---|---|---|
| 1 | 96 | 4 | 1150 | 5:95 | Absence | 24 | 629 | 250 | Hot-Press[3] (1800° C. × 4 h) |
| 2 | 96 | 4 | 1180 | 5:95 | Absence | 11 | 491 | 250 | Hot-Press[3] (1800° C. × 4 h) |
| 3 | 96 | 4 | 1150 | 1.5:98.5 | Absence | 7 | 159 | 250 | Hot-Press[3] (1800° C. × 4 h) |
| 4 | 96 | 4 | 1150 | 5:95 | Absence | 24 | 529 | 2500 | Hot-Press[3] (1800° C. × 4 h) |
| 5 | 96 | 4 | 1150 | 5:95 | Absence | 24 | 529 | 0 | Hot-Press[3] (1800° C. × 4 h) |
| 6 | 96 | 4 | 1200 | 5:95 | 0.025 | — | 652 | 250 | Hot-Press[3] (1800° C. × 4 h) |
| 7 | 96 | 4 | 1150 | 5:95 | Absence | 24 | 529 | 250 | HIP Sintering After Pressureless Sintering in Air[4] |
| 8 | 96 | 4 | — | 5:95 | Absence | 1439 | 2271 | 250 | Hot-Press[3] (1800° C. × 4 h) |
| 9 | 96 | 4 | 1200 | 5:95 | Absence | 5 | 331 | 250 | Hot-Press[3] (1800° C. × 4 h) |
| 10 | 96 | 4 | 900 | 5:95 | Absence | 343 | 747 | 250 | Hot-Press[3] (1850° C. × 4 h) |
| 11 | — | — | — | 0:100 | 0.004 | — | 51 | 250 | Hot-Press[3] (1800° C. × 4 h) |
| 12 | 96 | 4 | 1150 | 5:95 | Absence | 24 | 529 | 250 | Pressureless Sintering in Air (1700° C. × 4 h) |

| | Properties of Alumina Sintered Body | | | | | | | | |
|---|---|---|---|---|---|---|---|---|---|
| Experimental Example | Degree of C-Plane Orientation (%) | Number of Pores[5] (number) | Number of Pores[6] (number) | Amount of Impurities[7] (ppm by mass) | Mg Content (ppm by mass) | C Content (ppm by mass) | $Al_2O_3$ Content[8] (% by mass) | In-Line Transmittance (%)[9] | In-Line Transmittance (%)[10] |
|---|---|---|---|---|---|---|---|---|---|
| 1 | 99.7 | 0 | 2 | Absence | 114 | 40 | 99.98 | 80.3 | 66.0 |
| 2 | 98.2 | 0 | 1 | Absence | 113 | 40 | 99.98 | 79.4 | 64.2 |
| 3 | 90.1 | 0 | 0 | Absence | 111 | 40 | 99.98 | 71.5 | 67.4 |
| 4 | 99.5 | 0 | 1 | Absence | 1132 | 30 | 99.88 | 70.2 | 56.3 |
| 5 | 98.3 | 0 | 0 | Absence | Absence | 40 | 100.00 | 74.7 | 52.5 |
| 6 | 99.0 | 0 | 0 | Absence | 112 | 40 | 99.98 | 76.2 | 62.3 |
| 7 | 92.2 | 0 | 0 | Absence | 113 | 40 | 99.98 | 78.2 | 62.4 |
| 8 | 55.5 | 0 | 0 | 23 | 112 | 40 | 99.98 | 69.9 | 67.5 |
| 9 | 98.0 | 0 | 0 | Absence | 115 | 40 | 99.98 | 75.4 | 61.9 |
| 10 | 79.2 | 125 | 161 | 182 | 118 | 40 | 99.97 | 0.4 | 0.2 |
| 11 | 0.3 | 0 | 0 | Absence | 113 | 40 | 99.98 | 58.1 | 41.8 |
| 12 | 30.7 | 172 | 211 | Absence | 114 | Absence | 99.99 | 0.0 | 0.0 |

[1]Mixing Ratio is a ratio of plate-like alumina powder to fine alumina powder.
[2]Amount of MgO shows mass ratio of MgO added to 100 parts by mass of mixed alumina powder.
[3]The pressure for hot-press sintering is 200 kgf/cm2
[4]The conditions for pressureless sintering in air was 1350° C. × 4 h. The conditions for HIP sintering was 185 MPa. 1800° C. × 2 h.
[5]A view field of 114 μm × 127 μm was observed.
[6]A view field of 1340.4 μm in length × 1607.0 μm in width.
[7]F content is calculated using the value measured by pyrohydrolysis-ion chromatography.
[8]The results of the measurements of F content measured by pyrohydrolysis-ion chromatography is reflected in $Al_2O_3$ content.
[9]The lowest value of in-line transmittance measured using the test pieces of 0.2 mm in thickness and the wavelength range of 350 nm to 1000 nm.
[10]The lowest value of in-line transmittance measured using the test pieces of 0.5 mm and the wavelength range of 300 nm to 1000 nm.

Experimental Example 2

An alumina sintered body was produced in the same manner as in Experimental Example 1, except that the annealing temperature for preparing the plate-like alumina powder was set at 1180° C. Since the heat treatment temperature was higher, an increased amount of F was evaporated, and consequently, mass ratios R1 and R2 in the mixed alumina powder were 11 and 491, respectively. The properties specified in 2. (1) to 2. (5) of the resulting alumina sintered body were obtained. The results are shown in Table 1.

Experimental Example 3

An alumina sintered body was produced in the same manner as in Experimental Example 1, except that the mass ratio of the plate-like alumina powder to the fine alumina powder in the mixed powder for forming a tape was 1.5:98.5. Since the proportion of the plate-like alumina powder containing F was reduced, mass ratios R1 and R2 in the mixed alumina powder were 7 and 159, respectively. The properties specified in 2. (1) to 2. (5) of the resulting alumina sintered body were obtained. The results are shown in Table 1.

Experimental Example 4

An alumina sintered body was produced in the same manner as in Experimental Example 1, except that the amount of magnesium oxide added when a tape was formed was 2500 ppm by mass. The properties specified in 2. (1) to 2. (5) of the resulting alumina sintered body were obtained. The results are shown in Table 1.

Experimental Example 5

An alumina sintered body was produced in the same manner as in Experimental Example 1, except that magnesium oxide was not added when sintering was performed. The properties specified in 2. (1) to 2. (5) of the resulting alumina sintered body were obtained. The results are shown in Table 1.

Experimental Example 6

An alumina sintered body was produced in the same manner as in Experimental Example 1, except that the annealing temperature for preparing the plate-like alumina powder was set at 1200° C., and that 0.025 part by mass of $AlF_3$ was added (externally) when a tape was formed. Mass ratio R2 in the mixed alumina powder was 652. The properties specified in 2. (1) to 2. (5) of the resulting alumina sintered body were obtained. The results are shown in Table 1.

Experimental Example 7

An alumina sintered body was produced in the same manner as in Experimental Example 1, except that sintering was performed by pressureless sintering in air and subsequent HIP sintering. Mass ratios R1 and R2 in the alumina raw material powder were 24 and 529, respectively. The conditions for pressureless sintering in air was held at 1350° C. for 4 hours. Also, the HIP sintering was performed at a pressure of 185 MPa with Ar as a pressure medium at 1800° C., and these conditions were held for 2 hours. The properties specified in 2. (1) to 2. (5) of the resulting alumina sintered body were obtained. The results are shown in Table 1.

Experimental Example 8

An alumina sintered body was produced in the same manner as in Experimental Example 1, except that the plate-like alumina powder was not annealed when prepared.

Since a large amount of F remained in the plate-like alumina powder, mass ratios R1 and R2 in the alumina raw material powder were 1439 and 2271, respectively. The properties specified in 2. (1) to 2. (5) of the resulting alumina sintered body were obtained. The results are shown in Table 1.

Experimental Example 9

An alumina sintered body was produced in the same manner as in Experimental Example 1, except that the annealing temperature for preparing the plate-like alumina powder was set at 1200° C. Since the heat treatment temperature was higher, an increased amount of F was evaporated, and consequently, mass ratios R1 and R2 in the mixed alumina powder were 5 and 331, respectively. The properties specified in 2. (1) to 2. (5) of the resulting alumina sintered body were obtained. The results are shown in Table 1.

Experimental Example 10

An alumina sintered body was produced in the same manner as in Experimental Example 1, except that the annealing temperature for preparing the plate-like alumina powder was set at 900° C., and that the hot-press sintering temperature was set at 1650° C. Mass ratios R1 and R2 in the mixed alumina powder were 343 and 747, respectively. The properties specified in 2. (1) to 2. (5) of the resulting alumina sintered body were obtained. The results are shown in Table 1.

Experimental Example 11

An alumina sintered body was produced in the same manner as in Experimental Example 1, except that the alumina raw material powder for forming a tape was composed of only a fine alumina powder TM-DAR, and that 0.004 part by mass of aluminum fluoride powder was added (externally) when the materials were mixed. Mass ratio R2 in the alumina raw material powder was 51. The properties specified in 2. (1) to 2. (5) of the resulting alumina sintered body were obtained. The results are shown in Table 1.

Experimental Example 12

An alumina sintered body was produced in the same manner as in Experimental Example 1, except that sintering was performed by pressureless sintering in air at 1700° C. Mass ratios R1 and R2 in the mixed alumina powder were 24 and 529, respectively. The properties specified in 2. (1) to 2. (5) of the resulting alumina sintered body were obtained. The results are shown in Table 1.

Evaluation

In Experimental Examples 1 to 7 and 9, the alumina raw material powder containing the plate-like alumina powder was prepared so that mass ratios R1 and R2 of F to Al in the alumina raw material powder would be 5 ppm or more and 15 ppm or more, respectively, and the compaction raw material containing this alumina raw material powder was formed into a tape. Then, the tape was pressure-sintered at 1700° C. or more (by hot-press sintering or HIP sintering). Accordingly, each of the alumina sintered bodies of Experimental Examples 1 to 7 and 9 exhibited a high degree of orientation, a high density, and a high purity: the degree of c-plane orientation was 90% or more; the number of pores was 0 in a view field of 114 μm×127 μm and 0 to 2 in a view field of 1340.4 μm×1607.0 μm; the total mass of impurity elements other than Mg and C was 100 ppm or less; and the alumina content was 99.8% by mass or more. The in-line transmittance in the wavelength range of 350 nm to 1000 nm was 60% or more for a thickness of 0.2 mm, and the in-line transmittance in the wavelength range of 300 nm to 1000 nm was 50% or more for a thickness of 0.5 mm. Thus the samples exhibited highly optical translucent. In Experimental Example 8, since R1 and R2 in the mixed alumina powder were high, the degree of c-plane orientation and in-line transmittance of the resulting alumina sintered body were rather low due to slightly excessive grain growth. The alumina sintered body however can be said to be a highly dense and pure high-orientation sintered body.

In Experimental Example 10, since the sintering temperature was excessively low, the resulting alumina sintered body exhibited a low degree of c-plane orientation and had many pores. In addition, the in-line transmittance was very low. In Experimental Example 11, since the plate-like alumina powder was not used, the resulting alumina sintered body exhibited a very low degree of c-plane orientation, consequently exhibiting an insufficient in-line transmittance. In Experimental Example 12, since sintering was performed by pressureless sintering in air, instead of pressure sintering, the resulting alumina sintered body exhibited a low degree of c-plane orientation and had many pores, consequently exhibiting an insufficient in-line transmittance.

Experimental Examples 13 to 22

Alumina sintered bodies were produced in the same manner as in Experimental Example 1, except that the mass ratio of the plate-like alumina powder to the fine alumina powder in the mixed powder for forming a tape, the amount of MgO, and the sintering temperature were set as shown in Table 2, and that the pressing pressure was maintained during cooling from the sintering temperature to 1200° C. and then released to zero in the temperature range of less than 1200° C. The properties specified in 2. (1) to 2. (5) of the resulting alumina sintered body were obtained. The results are shown in Table 2.

TABLE 2

| | Production Conditions of Alumina Sintered Body | | | | | | | |
|---|---|---|---|---|---|---|---|---|
| | Preparation of Plate-Like Alumina Powder | | | Tape Forming | | | | |
| | | | | | Added Amount | | Amount of | |
| Experimental Example *4 | γ-Al$_2$O$_3$ (% by mass) | AlF$_3$ (% by mass) | Annealing Temperature (° C.) | Mixing Ratio*1 | of AlF$_3$ (% by mass) | R1 | R2 | MgO*2 (ppm by mass) | Sintering |
| 13 | 96 | 4 | 1150 | 1.5:98.5 | Absence | 7 | 159 | 250 | Hot-Press*3 (1975° C. × 4 h) |
| 14 | 96 | 4 | 1150 | 1.5:98.5 | Absence | 7 | 159 | 250 | Hot-Press*3 (1900° C. × 4 h) |
| 15 | 96 | 4 | 1150 | 0.75:99.25 | Absence | 5 | 79 | 250 | Hot-Press*3 (1900° C. × 4 h) |
| 16 | 96 | 4 | 1150 | 1.5:98.5 | Absence | 7 | 159 | 350 | Hot-Press*5 (1900° C. × 4 h) |
| 17 | 96 | 4 | 1150 | 1.5:98.5 | Absence | 7 | 159 | 500 | Hot-Press*3 (1900° C. × 4 h) |
| 18 | 96 | 4 | 1150 | 2:98 | Absence | 10 | 212 | 350 | Hot-Press*3 (1900° C. × 4 h) |
| 19 | 96 | 4 | 1150 | 2.5:97.5 | Absence | 12 | 265 | 250 | Hot-Press*3 (1900° C. × 4 h) |
| 20 | 96 | 4 | 1150 | 2.5:97.5 | Absence | 12 | 265 | 350 | Hot-Press*3 (1950° C. × 4 h) |
| 21 | 96 | 4 | 1150 | 2:98 | Absence | 10 | 212 | 350 | Hot-Press*3 (1850° C. × 4 h) |
| 22 | 96 | 4 | 1150 | 2.5:97.5 | Absence | 12 | 265 | 250 | Hot-Press*3 (1850° C. × 4 h) |
| 23 | 96 | 4 | — | 5:95 | Absence | 1439 | 2271 | 2500 | Hot-Press*3 (1800° C. × 4 h) |
| 24 | 96 | 4 | — | 5:95 | Absence | 1439 | 2271 | 1000 | Hot-Press*3 (1800° C. × 4 h) |
| 25 | 96 | 4 | — | 10:90 | Absence | 2879 | 4548 | 2500 | Hot-Press*3 (1800° C. × 4 h) |
| 26 | 96 | 4 | 900 | 2.5:97.5 | Absence | 17 | 425 | 250 | Hot-Press*3 (1950° C. × 4 h) |
| 27 | 96 | 4 | 900 | 2.5:97.5 | Absence | 17 | 425 | 250 | Hot-Press*3 (1900° C. × 4 h) |
| 28 | — | — | — | 0:100 | Absence | 0 | 0 | 250 | Hot-Press*3 (1975° C. × 4 h) |

| | Properties of Alumina Sintered Body | | | | | | | | |
|---|---|---|---|---|---|---|---|---|---|
| Experimental Example *4 | Degree of C-Plane Orientation (%) | Number of Pores*5 (number) | Number of Pores*6 (number) | Amount of Impurities*7 (ppm by mass) | Mg Content (ppm by mass) | C Content (ppm by mass) | Al$_2$O$_3$ Content*8 (% by mass) | In-Line Transmittance (%)*9 | In-Line Transmittance (%)*10 |
| 13 | 96.1 | 0 | 0 | Absence | 112 | 40 | 99.98 | 83.0 | 79.1 |
| 14 | 67.7 | 0 | 8 | Absence | 113 | 40 | 99.98 | 80.6 | 73.8 |
| 15 | 93.4 | 0 | 2 | Absence | 113 | 40 | 99.98 | 81.0 | 74.0 |
| 16 | 95.1 | 0 | 4 | Absence | 224 | 40 | 99.97 | 79.6 | 71.1 |

TABLE 2-continued

| | | | | | | | | | |
|---|---|---|---|---|---|---|---|---|---|
| 17 | 96.0 | 0 | 0 | Absence | 320 | 40 | 99.96 | 75.9 | 62.0 |
| 18 | 99.9 | 0 | 6 | Absence | 157 | 40 | 99.98 | 81.5 | 76.1 |
| 19 | 99.9 | 2 | 13 | Absence | 113 | 40 | 99.98 | 80.9 | 71.6 |
| 20 | 97.5 | 1 | 11 | Absence | 158 | 40 | 99.98 | 82.2 | 77.7 |
| 21 | 71.0 | 2 | 12 | Absence | 157 | 40 | 99.98 | 76.1 | 61.1 |
| 22 | 99.7 | 0 | 5 | Absence | 112 | 40 | 99.98 | 79.0 | 68.4 |
| 23 | 75.0 | 0 | 2 | 22 | 1119 | 40 | 99.88 | 82.8 | 79.1 |
| 24 | 55.5 | 0 | 3 | 24 | 447 | 40 | 99.95 | 82.0 | 76.5 |
| 25 | 5.9 | 0 | 2 | 41 | 1214 | 40 | 99.87 | 79.9 | 69.1 |
| 26 | 100.0 | 0 | 0 | Absence | 111 | 40 | 99.98 | 82.6 | 78.8 |
| 27 | 99.9 | 4 | 17 | Absence | 112 | 40 | 99.98 | 80.6 | 73.3 |
| 28 | 0.0 | 1 | 5 | Absence | 112 | 40 | 99.98 | 55.0 | 41.6 |

*[1] Mixing Ratio is a ratio of plate-like alumina powder to fine alumina powder.
*[2] Amount of MgO shows mass ratio of MgO added to 100 parts by mass of mixed alumina powder.
*[3] The pressure for hot-press sintering is 200 kgf/cm2
*[4] In Experimental Example 13 to 30. the pressure is reduced to 0 kgf/cm$^2$ when cooling to 1200° C. after sintering.
*[5] A view of field of 114 μm × 127 μm was observed
*[6] A view field of 1340.4 μm in length × 1607.0 μm in width.
*[7] F content is calculated using the value measured by pyrohydrolysis-ion chromatography.
*[8] The results of the measurements of F content measured by pyrohydrolysis-ion chromatotraphy is reflected in Al$_2$O$_3$ content.
*[9] The lowest value of in-line transmittance measured using the test pieces of 0.2 mm in thickness and the wavelength range of 350 nm to 1000 nm.
*[10] The lowest value of in-line transmittance measured using the test pieces of 0.5 mm and the wavelength range of 300 nm to 1000 nm.

Experimental Examples 23 to 25

Alumina sintered bodies were produced in the same manner as in Experimental Example 8, except that the mass ratio of the plate-like alumina powder to the fine alumina powder in the mixed powder for forming a tape, the amount of MgO, and the sintering temperature were set as shown in Table 2, and that the pressing pressure was maintained during cooling from the sintering temperature to 1200° C. and then released to zero in the temperature range of less than 1200° C. The properties specified in 2. (1) to 2. (5) of the resulting alumina sintered body were obtained. The results are shown in Table 2.

Experimental Examples 26 and 27

Alumina sintered bodies were produced in the same manner as in Experimental Example 1, except that the annealing for preparing the plate-like alumina powder was performed at 900° C. in flowing air (air flow rate: 25000 cc/min) for 3 hours, that the mass ratio of the plate-like alumina powder to the fine alumina powder in the mixed powder for forming a tape and the sintering temperature were set as shown in Table 2, and that the pressing pressure was maintained during cooling from the sintering temperature to 1200° C. and then released to zero in the temperature range of less than 1200° C. The properties specified in 2. (1) to 2. (5) of the resulting alumina sintered body were obtained. The results are shown in Table 2.

Experimental Example 28

An alumina sintered body was produced in the same manner as in Experimental Example 1, except that the alumina raw material powder for forming a tape was composed of only a fine alumina powder with a F content of zero, that the sintering temperature were set as shown in Table 2, and that the pressing pressure was maintained during cooling from the sintering temperature to 1200° C. and then released to zero in the temperature range of less than 1200° C. The properties specified in 2. (1) to 2. (5) of the resulting alumina sintered body were obtained. The results are shown in Table 2.

EVALUATION

In Experimental Examples 13 to 27, the alumina raw material powder containing the plate-like alumina powder was prepared so that mass ratios R1 and R2 of F to Al in the alumina raw material powder would be 5 ppm or more and 15 ppm or more, respectively, and the compaction raw material containing this alumina raw material powder was formed into a tape. Then, the tape was pressure-sintered at 1700° C. or more (by hot-press sintering). Accordingly, each of the alumina sintered bodies of Experimental Examples 13 to 27 exhibited a high degree of orientation, a high density, and a high purity: the degree of c-plane orientation was 5% or more; the number of pores was 0 to 4 in a view field of 114 μm×127 μm and 0 to 17 in a view field of 1340.4 μm×1607.0 μm; the total mass of impurity elements other than Mg and C was 100 ppm or less; and the alumina content was 99.8% by mass or more. The in-line transmittance in the wavelength range of 350 nm to 1000 nm was 70% or more for a thickness of 0.2 mm, and the in-line transmittance in the wavelength range of 300 nm to 1000 nm was 60% or more for a thickness of 0.5 mm. Thus the samples exhibited highly optical translucent.

In Experimental Example 28, since the plate-like alumina powder was not used, the resulting alumina sintered body exhibited a very low degree of c-plane orientation, consequently exhibiting an insufficient in-line transmittance.

Experimental Examples 1 to 9 and 13 to 27 of Experimental Examples 1 to 28 correspond to Examples of the present invention. The present invention is not limited to these Experimental Examples, and various forms can be applied to the invention within the technical scope of the invention.

The present application claims priority from Japanese Patent Application No. 2014-241685, filed on Nov. 28, 2014 and Japanese Patent Application No. 2015-98524, filed on May 13, 2015, the entire contents of which are incorporated herein by reference.

What is claimed is:

1. A method for producing a transparent alumina sintered body, the method comprising:
(a) the step of preparing an alumina raw material powder by mixing a plate-like alumina powder with a fine alumina powder having a smaller average particle diameter than the plate-like alumina powder so that the proportion of the plate-like alumina powder to the fine alumina powder is 0.1:99.9 to 15:85 on a mass basis, the plate-like alumina powder having an aspect ratio of 3 or more so that a mass ratio R1 of F to Al in the alumina raw material powder is 5 ppm or more, and forming a compaction raw material containing the alumina raw material powder into a compact; and (b) the step of pressure-sintering the compact at 1700° C. or more to yield a transparent alumina sintered body, wherein the mass ratio R1 is a ppm-by-mass value calculated using the following equation (1), and wherein in equation (1), X represents the mass ratio, in ppm-by-mass, of F to Al in the plate-like alumina powder, the F content in the plate-like alumina powder is obtained by pyrohydrolysis-ion chromatography, the Al content in the plate-like alumina powder is calculated by using a value obtained by multiplying by 0.529 the alumina purity of the plate-like alumina powder defined as 100−(total percentage by mass of impurity elements other than Al and O), and the percentage by mass of each impurity element is determined by performing high-frequency heating infrared absorption spectroscopy for S, inert gas fusion-thermal conductivity method for N, inert gas fusion-non-dispersive infrared absorption spectroscopy for H, pyrohydrolysis-ion chromatography for F, and inductively coupled plasma emission (ICP) spectroscopy for all other elements:

$$R1 = X \times (\text{mass of plate-like alumina/mass of alumina raw material powder}) \quad (1).$$

2. The method for producing a transparent alumina sintered body according to claim 1, wherein a mixed raw material powder is prepared in the step of (a) by adding 100 ppm to 5000 ppm by mass of MgO to 100 parts by mass of the alumina raw material powder.

3. The method for producing a transparent alumina sintered body according to claim 1, wherein the sintering in the step of (b) is performed so that each of the contents of impurity elements other than Mg and C becomes 10 ppm by mass or less.

4. The method for producing a transparent alumina sintered body according to claim 1, wherein the step of (b) includes applying a pressure of 50 kgf/cm² or more during cooling of the compact from the pressure-sintering temperature to a predetermined temperature in the range of 1000° C. to 1400° C., and reducing the pressure to less than 50 kgf/cm² in the temperature range of the predetermined temperature or less.

5. A method for producing a transparent alumina sintered body, the method comprising:
(a) the step of preparing an alumina raw material powder by mixing a plate-like alumina powder with a fine alumina powder having a smaller average particle diameter than the plate-like alumina powder so that the proportion of the plate-like alumina powder to the fine alumina powder is 0.1:99.9 to 15:85 on a mass basis, the plate-like alumina powder having an aspect ratio of 3 or more so that a mass ratio R2 of F to Al in the alumina raw material powder is 15 ppm or more, and forming a compaction raw material containing the alumina raw material powder into a compact; and
(b) the step of pressure-sintering the compact at 1700° C. or more to yield a transparent alumina sintered body, wherein the mass ratio R2 is a ppm-by-mass value calculated using the following equation (2), and wherein the proportion of the plate-like alumina powder to the fine alumina powder in the alumina raw material powder is T:(100−T), wherein T and (100−T) are on a mass % basis, and if an additive is externally added to the alumina raw material powder, the proportion of the additive to the alumina raw material powder is Z, in % by mass, wherein x1 represents the F content, in ppm-by-mass in the plate-like alumina powder, x2 represents the F content in ppm-by-mass, in the fine alumina powder, x3 represents the F content, in ppm-by-mass in the additive, and the F content is obtained by alkali fusion-ion chromatography, wherein y1 represents the Al content, in % by mass, in the plate-like alumina powder, y2 represents the Al content (% by mass) in the fine alumina powder, the Al content is defined as a value obtained by multiplying by 0.529 the alumina purity of the corresponding alumina powder defined as 100−(total percentage by mass of impurity elements other than Al and O), and the percentage by mass of each impurity element is determined by performing high-frequency heating infrared absorption spectroscopy for S, inert gas fusion-thermal conductivity method for N, inert gas fusion-non-dispersive infrared absorption spectroscopy for H, alkali fusion-ion chromatography for F, and ICP emission spectroscopy for all other elements, and wherein y3 represents the Al content, in % by mass, in the additive, determined by ICP emission spectroscopy:

$$R2 = 100 \times [x1 \times T + x2 \times (100-T) + x3 \times Z]/[y1 \times T + y2 \times (100-T) + y3 \times Z] \quad (2).$$

6. The method for producing a transparent alumina sintered body according to claim 5, wherein a mixed raw material powder is prepared in the step of (a) by adding 100 ppm to 5000 ppm by mass of MgO to 100 parts by mass of the alumina raw material powder.

7. The method for producing a transparent alumina sintered body according to claim 5, wherein the sintering in the step of (b) is performed so that each of the contents of impurity elements other than Mg and C becomes 10 ppm by mass or less.

8. The method for producing a transparent alumina sintered body according to claim 5, wherein the step of (b) includes applying a pressure of 50 kgf/cm² or more during cooling of the compact from the pressure-sintering temperature to a predetermined temperature in the range of 1000° C. to 1400° C., and reducing the pressure to less than 50 kgf/cm² in the temperature range of the predetermined temperature or less.

* * * * *